United States Patent [19]

Higby et al.

[11] 4,149,564
[45] Apr. 17, 1979

[54] PROPORTIONING VALVE

[75] Inventors: Philip J. Higby, Towaco; Victor Treiber, Vernon, both of N.J.

[73] Assignee: Foremost Machine Builders, Inc., Fairfield, N.J.

[21] Appl. No.: 796,448

[22] Filed: May 12, 1977

[51] Int. Cl.² .................................................. F16K 11/02
[52] U.S. Cl. ............................ 137/625.44; 137/625.4; 137/592
[58] Field of Search ................ 137/625.4, 625.44, 875, 137/592

[56] References Cited

U.S. PATENT DOCUMENTS

| | | | |
|---|---|---|---|
| 1,813,273 | 7/1931 | Bovey | 137/625.44 X |
| 2,767,738 | 10/1956 | Pottmeyer | 137/625.44 |
| 3,521,659 | 7/1970 | Seger | 137/625.44 X |
| 4,019,535 | 4/1977 | Buckethal | 137/625.45 X |

FOREIGN PATENT DOCUMENTS 413804  6/1910  France ................................ 137/625.44

*Primary Examiner*—Gerald A. Michalsky
*Attorney, Agent, or Firm*—Watson, Leavenworth, Kelton & Taggart

[57] ABSTRACT

Various embodiments of a proportioning valve are described and shown for location at the discharge ends of a pair of conduits wherein the movable valve member cooperates with the open ends of said conduits. The valve member can be planar or with a dihedral surface and mounted for rotation alternately into obturating relation with one or the other of said conduit open ends which may be square with the conduit axis or cut obliquely. Additionally, the conduit ends may be straight or bent so as to position their mouths either horizontally, vertically or in an oblique plane. Some of the valve members are mounted centrally while others are mounted adjacent an edge, some are mounted for movement about a vertical axis, others about a horizontal axis. An example is given of a use for the valves in combination with a vacuum loader although the valves can be used effectively for controlling discharge of fluent solid material from two sources into any space either under vacuum or positive pressure feed.

4 Claims, 16 Drawing Figures

PROPORTIONING VALVE

The present invention relates to a proportioning valve and, more particularly, to such valve for controlling the discharge of fluent solid material from two sources into a space.

While, as will appear from the ensuing discussion, the proportioning valve of the present invention is not restricted thereto, its particular utility and advantages can best be explained wth reference by way of example to its use in combination with a vacuum loader. Typically, a vacuum loader comprises a receptacle which is divided into suction and material receiving chambers by an air or gaseous fluid filter, the suction chamber having an outlet for connection to a vacuum source, the material receiving chamber having an inlet for receiving material, usually at an upper point, and an outlet for discharge of material. The discharge outlet is generally at the bottom of the material receiving chamber and usually provided with a vacuum controlled valve for closing same during filling of the material receiving chamber. This type of loader is well known.

Also well known are loaders of the foregoing type provided with plural material inlets or single inlets connected by Y junctions to plural supplies of material. In such instances, some form of external valving has been provided for controlling the passage of material into the loader from a plurality of sources. Such control is required when it is desired to combine or mix material from plural supplies. For example, in the plastic molding industry, it is often the practive to combine virgin and scrap resin to achieve maximum economy. Heretofore, separate batch mixing has been required although a certain degree of mixing can be achieved with a vacuum loader connected to plural material sources. Unfortunately, the various valving arrangements used prior to the present invention have one or more drawbacks or limitations. They are slow acting, ineffective as positive closures, complex, subject to wear, jammable and cloggable.

By way of further explanation of the problem with existing valving equipment, attempts have been made to use butterfly valves within the ducts interconnecting the sources of supply with the vacuum loader. Unless the butterfly valve is located in a vertical run of the piping, there is a great tendency for material to be trapped or wedged between the edge of the valve member and the wall of the duct when the valve is being urged into its closed position. Only with vertical runs is this problem minimized since the material tends to fall downstream of the valve under the force of gravity.

The butterfly valve also has the drawback that its perimeter must be constructed to close tolerance in order to fit closely the inner diameter of the duct which also must be held to close tolerance. This makes fabrication of the butterfly type valve a costly procedure.

Because of space limitations or requirements, it is not always possible to locate the valve in a vertical run or, if it is possible, the valve must be located a significant distance from the vacuum loader or discharge end of the duct it controls. This creates another problem in that closure of the valve does not result in immediate interruption of the flow of material into the vacuum loader. The material downstream of the valve will continue to be drawn into the loader placing a restriction on the accuracy of control.

Therefore, it is an object of the present invention to provide a very simple, economical, positive acting, selfcleaning, long lived, maintenance proportioning valve for controlling the discharge of material from two sources into a space, for example, the interior of a vacuum loader.

In accordance with one aspect of the present invention, there is provided a proportioning valve for controlling the discharge of fluent solid material from two sources into a space, comprising in combination a pair of conduits adjacently mounted with a first end of each in mutual proximity, said conduits each having a second end for coupling each conduit to a different one of said two sources, a valve plate, means articulably mounting said valve plate between said first ends of said conduits for movement between two positions in each of which positions a different one of said first ends is obturated while the other is essentially unobstructed, and means for mounting said conduits with said first ends and said valve plate in said space.

In accordance with a further aspect of the present invention, there is provided a proportioning valve for installation within a vacuum loader for controlling the entry of material into its loading chamber, comprising in combination a pair of conduits having open ends mounted in generally parallel spaced apart relationship for projection into said loading chamber, and a valve member having a dihedral configuration with an obtuse dihedral angle mounted for rotational movement alongside said open ends of said conduits for disposition with the latter inside said loading chamber, said valve member being mounted for rotation about an axis lying in a plane that contains the vertex of and subdivides said dihedral angle, and each plane section of said valve member is arranged to cooperate with a different one of said conduit open ends, the relative relation of said conduit open ends to said valve member being chosen such that said valve member is movable selectively between two positions in each of which positions a different one of said conduit open ends is obturated while the other is essentially unobstructed.

The invention will be better understood after reading the following detailed description of the presently preferred embodiments thereof with reference to the appended drawings in which:

FIG. 7 is an edge view of the valve member employed in the embodiment of FIGS. 1–6;

FIG. 8 is a side view of the valve member of FIG. 7;

FIG. 9 is a perspective view of the proportioning valve shown in FIGS. 1 to 8 and helpful in visualizing the structure;

Reference should now be had to the drawings wherein the same reference numerals are used throughout to designate the same or similar parts.

Figure 1:
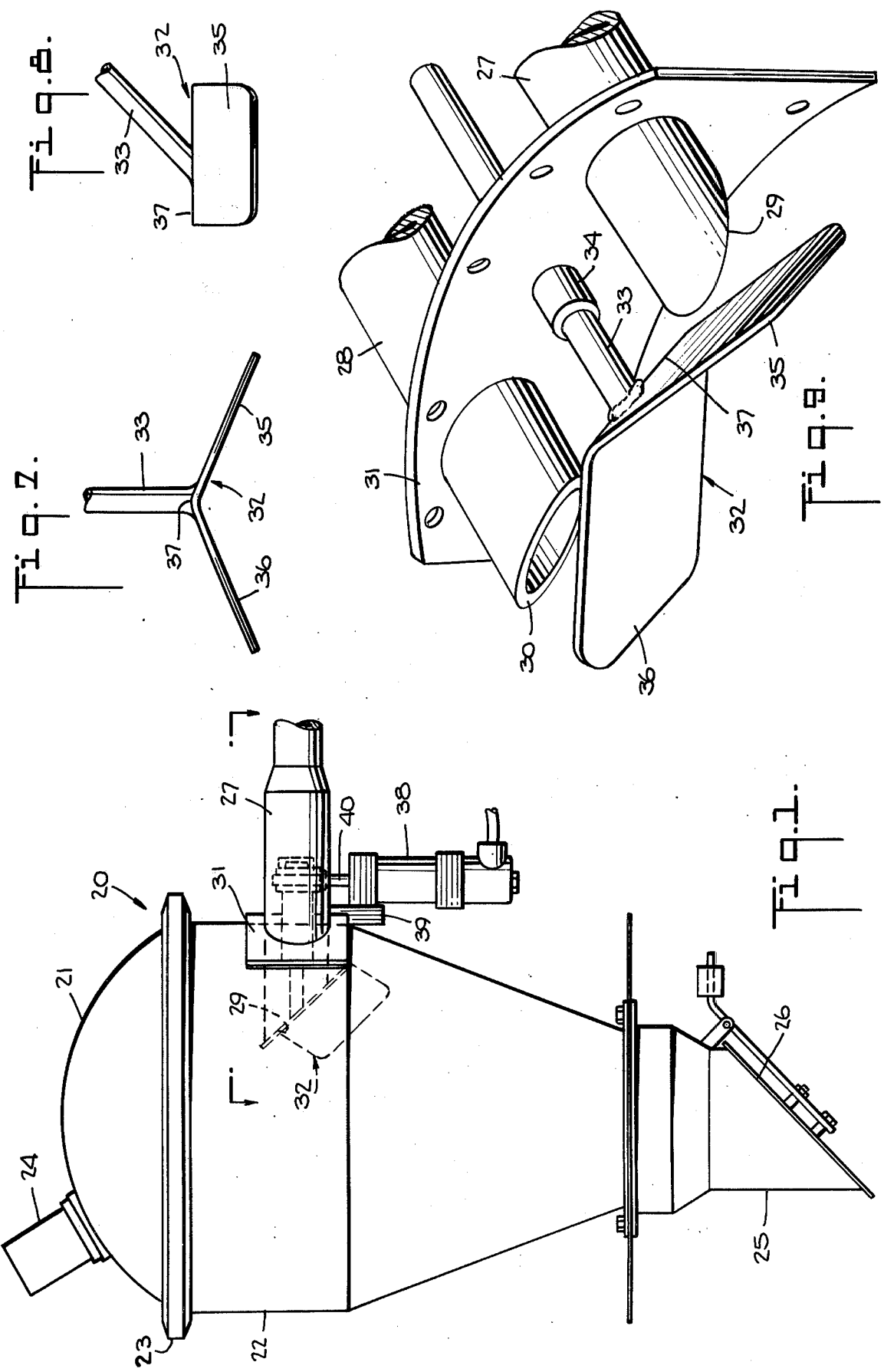
FIG. 1 is an elevational view of a typical vacuum loader to which one embodiment of the proportioning valve of the present invention is shown connected.

In FIG. 1 there is shown a typical vacuum loader 20 having suction and material receiving chambers 21 and 22, respectively, separated by an air or gaseous fluid filter 23. The suction chamber 21 has an outlet 24 for connection to a vacuum source. The material receiving chamber 22 has an inlet to be described below for receiving material. It also has an outlet 25 at the bottom of the chamber 22 which outlet is provided with a vacuum controlled valve 26 for closing outlet 25 during filling of the material receiving chamber 22.

The inlet for introducing material into chamber 22 is constructed in accordance with the present invention and is actually the valve. As seen in FIGS. 1 through 9, it consists of a pair of conduits 27 and 28 having respective open ends 29 and 30 mounted in generally parallel spaced apart relationship for projection into the loading chamber 22. The conduits 27 and 28 may be mounted in an arcuate frame member or support plate 31 arranged to be bolted or otherwise fastened to the cylindrical exterior of the vacuum loader chamber 22. The valve also includes a valve plate or member 32 mounted at the end of a shaft 33 for rotational movement in a bearing 34 alongside the open ends 29 and 30 of the conduits 27 and 28 for disposition with the latter inside the loading chamber 22, as best seen in FIG. 1.

Figure 2:
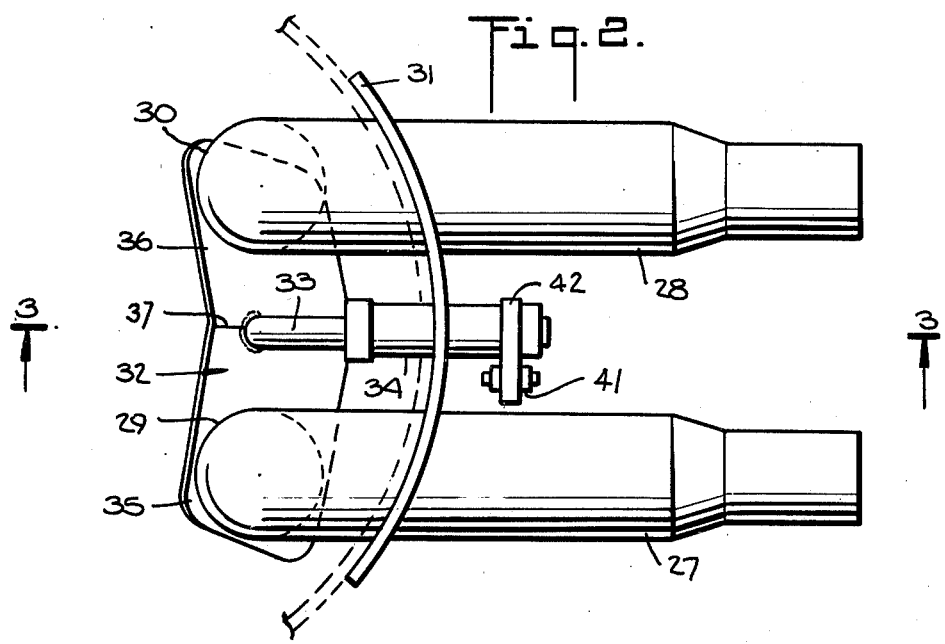
FIG. 2 is a top view of the valve of FIG. 1, drawn to an enlarged scale, as seen along the line 2—2 in FIG. 1.
Figure 6:
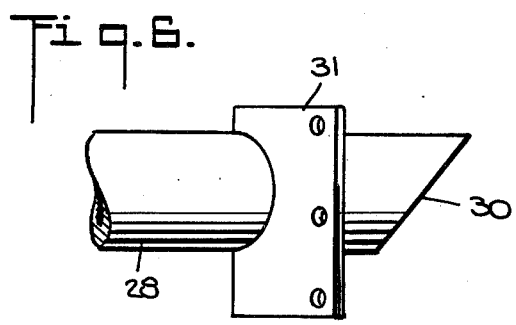
FIG. 6 is a fragmentary side view of the conduit portion of the valve taken along the line 6—6 in FIG. 4.

As best seen in FIG. 6, the end 30 of the conduit 28 terminates in an oblique plane relative to the longitudinal axis of the conduit. Likewise end 29 of conduit 27 is terminated similarly. Referring to FIGS. 1 to 9, it will be observed that the valve plate 32 has a dihedral configuration with an obtuse dihedral angle and, as best seen in FIGS. 2, 4 and 9, each plane section 35 and 36 is arranged to cooperate with a different one of the conduit open ends 29 and 30, respectively. The axis of the shaft 33 will be seen to lie in a plane that contains the vertex 37 of and subdivides the dihedral angle of the plate 32. As seen in FIG. 8, the axis of the shaft 33 intersects the vertex 37 at an acute angle.

Figure 3:
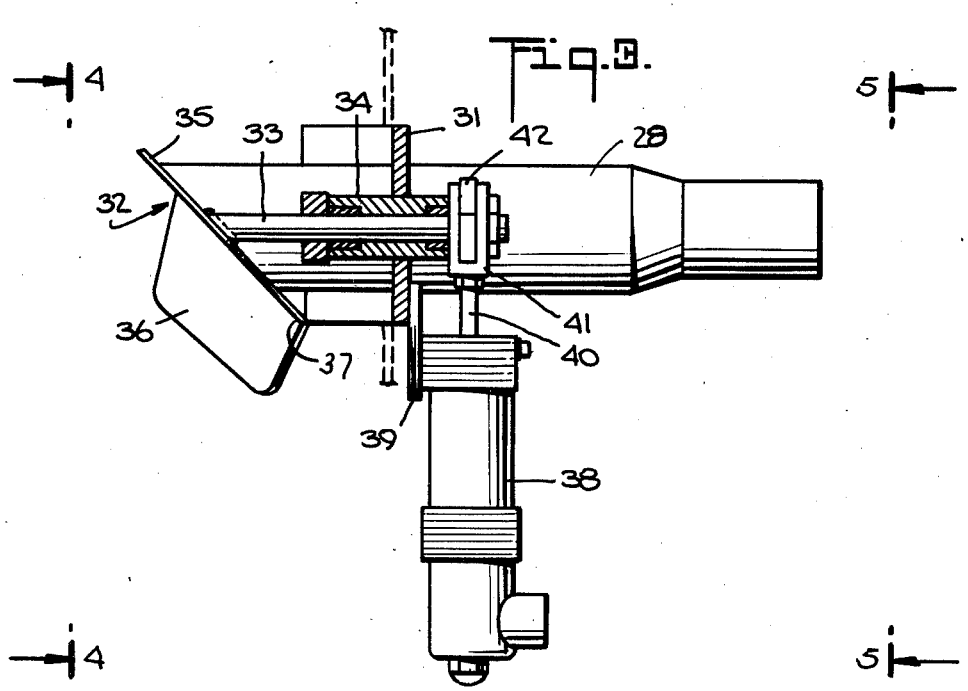
FIG. 3 is a vertical sectional view of the valve taken along line 3—3 in FIG. 2.
Figure 5:
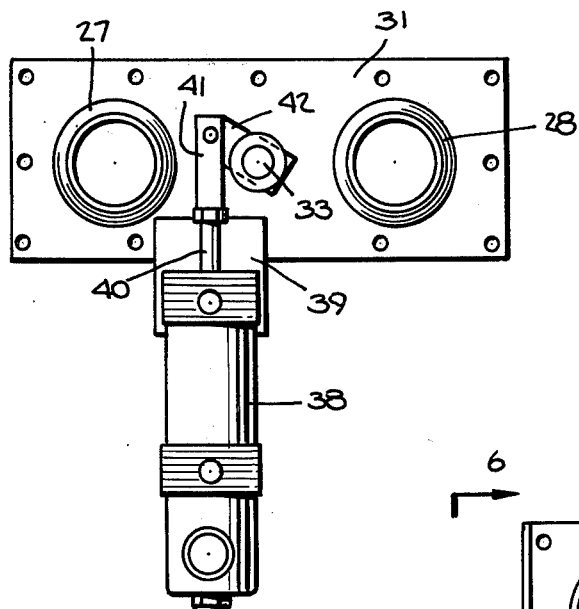
FIG. 5 is a rear elevational view of the valve as seen along the line 5—5 in FIG. 3.
Figure 4:
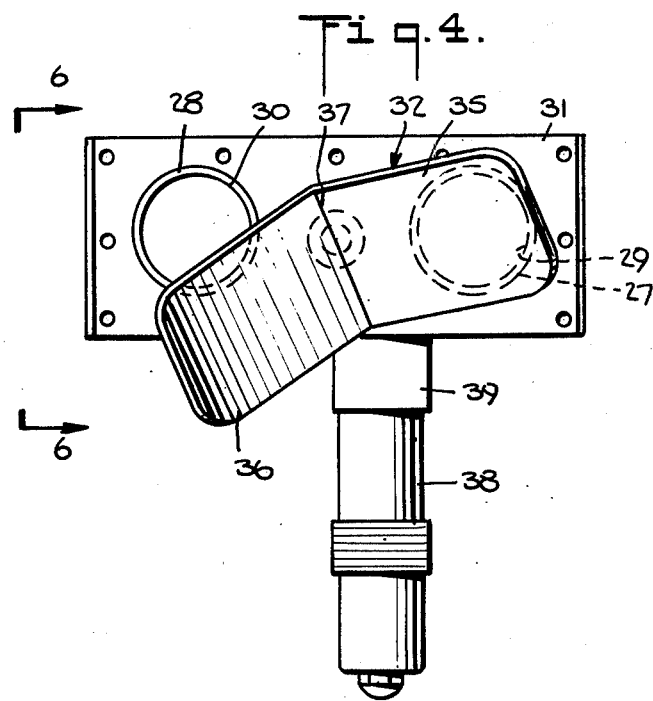
FIG. 4 is a front elevational view of the valve as seen along the line 4—4 in FIG. 3.

Referring to FIGS. 2, 3, and 5, a solenoid controlled pneumatic actuator 38 is mounted on a bracket 39 joined to the frame member or support plate 31 and has its output rod 40 connected by a clevis 41 to a crank arm 42 joined to shaft 33 for rotationally positioning the valve plate 32. Thus, when the actuator 38 is extended as shown in FIGS. 1, 2, 3, 4 and 5 of the drawings, the section 35 of valve plate 32 is in contact with and obturating the end 29 of the conduit 27. Retraction of the actuator rod 40 by the actuator 38 will rotate the valve plate 32 in the clockwise direction as viewed in FIG. 4 such that section 36 of the plate 32 comes into engagement with open end 30 of conduit 28 obturating said open end while opening the end 29 of conduit 27. In FIG. 9, the valve is shown in perspective view in its neutral position wherein both conduits 27 and 28 are half open.

The embodiment shown in FIGS. 1 to 9 affords a fairly compact arrangement but because of its complex geometry is best laid out empirically. The oblique open ends 29 and 30 of conduits 27 and 28 need not lie in a common plane. However, there should conveniently exist a mirror symmetry about a vertical plane midway between and parallel to both conduits.

It should now be evident that the valve described above is not characterized by the disadvantages inherent in the butterfly type valve. Instead, the valve is located in "open space" having no precision parts and such that particles downstream of the valve plate member are free to fall away from the valve avoiding jamming or clogging. The principles can be extended to many alternative configurations of which a few will now be described.

Figure 10:
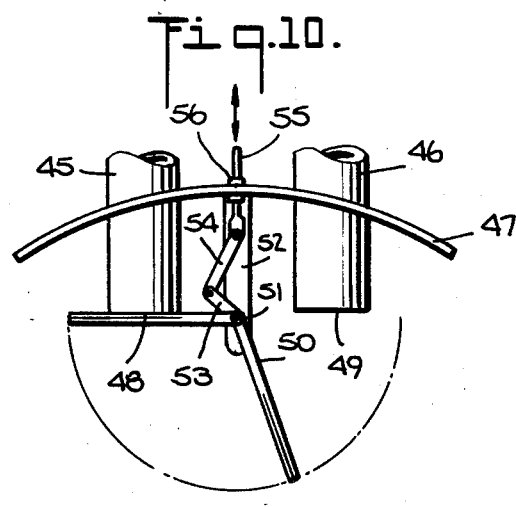
FIG. 10 is a top view similar to FIG. 2 but showing a second embodiment of the valve.

FIG. 10 shows parallel conduits 45 and 46 mounted horizontally in arcuate support plate 47 with squared ends 48 and 49, respectively. A valve member 50 with a dihedral surface is mounted for rotation about a vertical shaft 51 journaled in a bracket 52 secured to plate 47. Only the bracket at the lower end of shaft 51 is illustrated, it being understood that a matching bracket on top of the shaft 51 would be joined to the plate 47.

The location of the shaft 51 relative to the open ends 48 and 49 of conduits 45 and 46 is such that rotation of valve member 50 will cause each half thereof to move alternatively into obturating relationship to the respective ends 48 and 49. In order to articulate the member 50, it is provided with a lever arm 53 connected by a link 54 to a push-pull actuator rod 55 passing through the plate 47 supported in a bearing 56.

Figure 11:
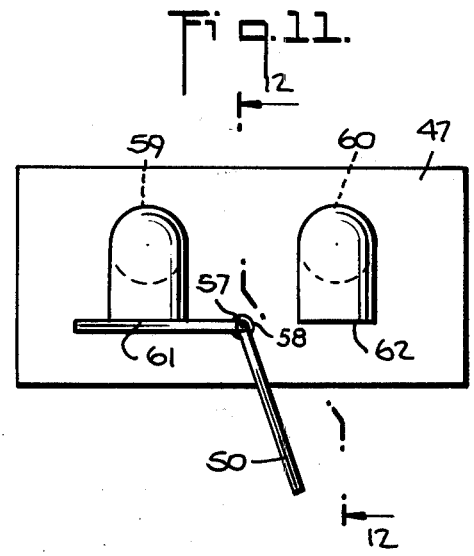
FIG. 11 is a front elevational view of a further embodiment of the valve employing a valve plate similar to that employed in the embodiment of FIG. 10 but differently mounted.
Figure 12:
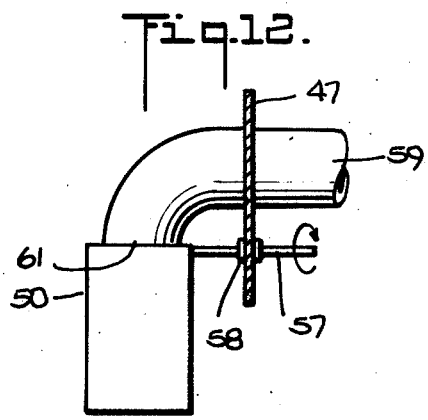
FIG. 12 is a sectional view of the embodiment of FIG. 11 taken along the line 12—12 therein.

A somewhat similar arrangement to that shown in FIG. 10 is illustrated in FIGS. 11 and 12. The valve plate member 50 instead of being mounted for rotation on a vertical shaft is mounted on horizontal shaft 57 passing directly through support plate 47 in bearing 58. In this embodiment, the ends of conduits 59 and 60 are curved downwardly after entering the "open space" such that the respective open ends 61 and 62 lie in a horizontal rather than a vertical plane. By comparing the embodiment of FIG. 10 with the embodiment of FIG. 11, it will be observed that in the latter the arrangement for mounting the valve plate 50 is simpler while in the former the conduits remain straight and do not require a bend as in the latter. Choice of one over the other will depend upon space requirements as well as the preferred direction of material discharge.

Figure 13:
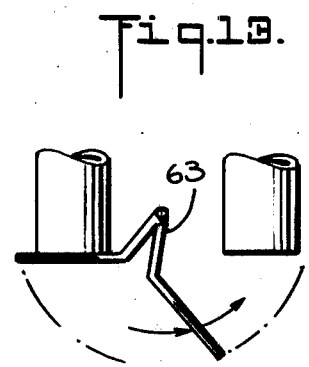
FIG. 13 is a diagrammatic view illustrating another embodiment of the valve.
Figure 14:
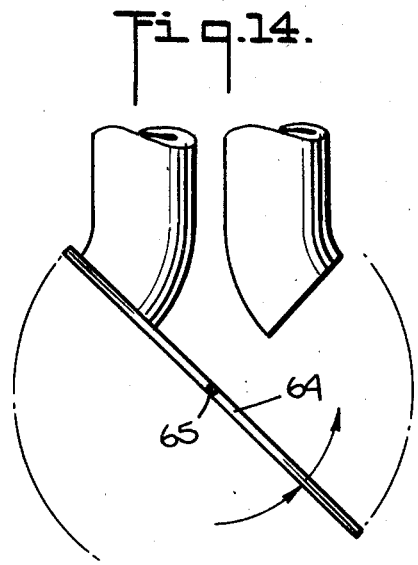
FIG. 14 is a diagrammatic view showing a still further embodiment of the valve.
Figure 15:
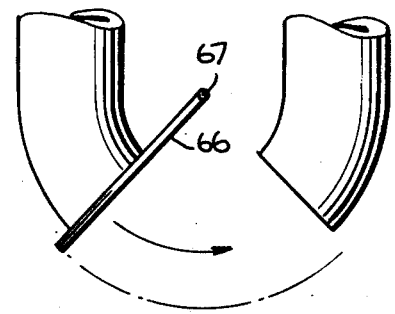
FIG. 15 is a diagrammatic view showing yet another embodiment of the valve.

FIGS. 13, 14 and 15 show further modifications of the relationship between the ends of the conduits and the valve plate member. In each of the modifications the movable valve plate may be mounted on a vertical axis similar to that shown in FIG. 10 or it may be mounted on a horizontal axis similar to that shown in FIG. 11. In the latter case the ends of the conduits would require a bend in the downward direction after passing through the mounting frame or support plate therefor. Specifically, the embodiment of FIG. 13 has a valve member 63 generally gull shaped. In FIG. 14, the valve member 64 is planar and mounted for rotation about a central axis 65, while in FIG. 15 the valve member 66 is also planar but mounted for rotation about a shaft 67 at one edge thereof.

Figure 16:
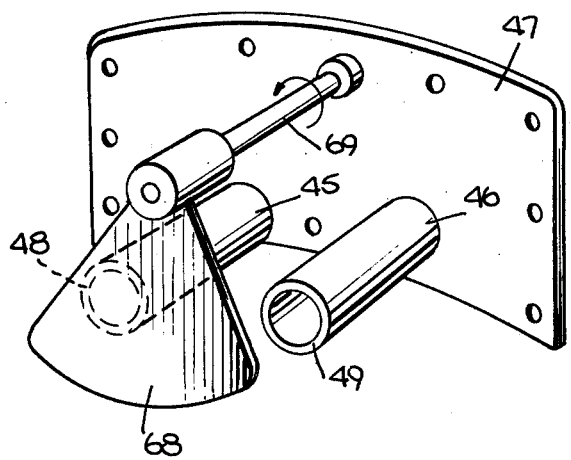
FIG. 16 is a perspective view of still another embodiment of the valve.

Finally, a still further approach is shown in FIG. 16 wherein the conduits are mounted similar to that shown in FIG. 10 but the valve plate member 68 is mounted on a shaft 69 for rotation therewith, moving in its own plane into registration alternately with one or the other of the conduit ends.

Having described the presently preferred embodiments of the invention, it will be understood that numerous changes in construction can be effected without departing from the true spirit of the invention as defined in the appended claims. While, as mentioned previously, the present proportioning valve has been described in conjunction with a vacuum loader, it should be understood that the valve can be used at the end of a pressure system for transporting or feeding material into an open container or hopper or a closed vessel, as desired. In each instance, the valve would be located at the discharge end of the conduits carrying the material. It has been found that the subject valve is capable of abrupt interruption of flow of material affording precise control of proportions when two materials are to be combined in a common chamber or space.

What is claimed is:

1. A proportioning valve for installation within a vacuum loader for controlling the entry of material into its loading chamber, comprising in combination a pair of cylindrical conduits having open ends mounted in generally parallel spaced apart relationship for projection into said loading chamber, said open ends each terminating in an oblique plane relative to the longitudinal axis of the respective conduit, and a valve member having a dihedral surface with an obtuse dihedral angle mounted for rotational movement alongside said open ends of said conduits for disposition with the latter inside said loading chamber, said valve member being mounted for rotation about an axis which intersects at an acute angle the vertex of and lies in a plane bisecting said dihedral angle, and each plane section of said dihedral surface is arranged to cooperate with a different one of said conduit open ends, the relative relation of said conduit open ends to said valve member being chosen such that said valve member is movable selectively between two positions in each of which positions a different one of said conduit open ends is obturated while the other is essentially unobstructed.

2. A proportioning valve for installation within a vacuum loader for controlling the entry of material into its loading chamber, comprising in combination a pair of conduits having open ends mounted in generally parallel spaced apart relationship for projection into said loading chamber, and a valve plate having a dihedral configuration with an obtuse dihedral angle mounted for rotational movement alongside said open ends of said conduits for disposition with the latter inside said loading chamber, said valve plate being mounted for rotation about an axis lying in a plane that contains the vertex of and subdivides said dihedral angle, said axis intersecting said vertex at an acute angle, and each plane section of said plate is arranged to cooperate with a different one of said conduit open ends, the relative relation of said conduit open ends to said valve plate being chosen such that said valve plate is movable selectively between two positions in each of which positions a different one of said conduit open ends is obturated while the other is essentially unobstructed.

3. A proportioning valve according to claim 2, wherein said plane bisects said dihedral angle.

4. A proportioning valve according to claim 3, wherein said conduits are cylindrical with their open ends each terminating in an oblique plane relative to the longitudinal axis of the respective conduit.

* * * * *

UNITED STATES PATENT OFFICE
CERTIFICATE OF CORRECTION

PATENT NO. : 4,149,564
DATED : April 17, 1979
INVENTOR(S) : Philip J. Higby et al It is certified that error appears in the above-identified patent and that said Letters Patent are hereby corrected as shown below:

Column 1, line 33, "practive" should read --practice--.

Column 2, line 3, before "maintenance" should be inserted --minimum--.

Signed and Sealed this

Thirty-first Day of July 1979

[SEAL]

Attest:

*Attesting Officer*

LUTRELLE F. PARKER
*Acting Commissioner of Patents and Trademarks*